United States Patent [19]

Shimizu et al.

[11] Patent Number: 4,752,536

[45] Date of Patent: Jun. 21, 1988

[54] METAL COATED POTASSIUM TITANATE FIBERS AND METHOD FOR MANUFACTURING THE SAME

[75] Inventors: Tadao Shimizu; Noriyuki Simizu, both of Tokyo; Shouji Harada, Saitama; Masami Miyamoto, Ibaraki, all of Japan

[73] Assignee: Nikkan Industries Co., Ltd., Tokyo, Japan

[21] Appl. No.: 852,737

[22] Filed: Apr. 16, 1986

[30] Foreign Application Priority Data

Apr. 19, 1985 [JP] Japan ................................. 60-83656

[51] Int. Cl.[4] ...................... B21C 37/00; B32B 15/00
[52] U.S. Cl. .................................. 428/607; 428/375; 428/379; 428/380; 428/381; 428/389; 428/605; 428/614; 428/632; 428/671; 428/673
[58] Field of Search .............. 428/380, 381, 889, 379, 428/605, 607, 614, 673, 632, 689, 699, 371

[56] References Cited

U.S. PATENT DOCUMENTS

| | | | |
|---|---|---|---|
| 1,779,809 | 10/1930 | Gray et al. | 428/673 |
| 3,380,847 | 4/1968 | Lewis et al. | 428/389 |
| 4,524,100 | 6/1985 | Shimizu et al. | 428/402 |

OTHER PUBLICATIONS

Chemical Abstracts, 99:24901q, 1983, of Japanese Patent 58/20722.

Primary Examiner—Sharon A. Gibson
Attorney, Agent, or Firm—Cushman, Darby & Cushman

[57] ABSTRACT

A process for producing silver-coated potassium titanate fibers comprises admixing the potassium titanate fibers with a silver ion solution containing a reducing agent. The resulting silver-coated potassium titanate fibers can, if desired, be provided with one or more additional metal coatings superimposed on the silver coat wherein the additional metal is other than silver.

5 Claims, No Drawings

METAL COATED POTASSIUM TITANATE FIBERS AND METHOD FOR MANUFACTURING THE SAME

FIELD OF THE INVENTION

The present invention relates to a method for metal coating the surface of potassium titanate fibers and the product thereof.

BACKGROUND OF THE INVENTION

Potassium titanate fibers are artificial mineral fibers having superior heat as well as chemical resistance characteristics. While potassium titanate fibers have been known in the past to be useful as an insulator, the present inventors considered that if these were metal coated, their use could be extended to various fields such as the manufacture of fiber reinforced composite metal materials, the addition of metal to dielectric materials and metal coating of dielectric materials.

However, prior to the present invention a process for metal coating potassium titanate fiber was not to the inventors knowledge available. Prior art electroless coating methods have not been employed to coat titanate fibers with a metal, since the various conditions or parameters such as catalyst, atmosphere, etc. have proved to be quite difficult to determine. Further, even if metal coating of potassium titanate fibers were theoretically possible, such a process, heretofore, has not been considered industrially feasible because of uneconomical manufacturing costs associated therewith.

The present invention provides a method for metal coating potassium titanate fibers which method is stable and sufficiently economical for industrial production. The present invention also relates to metal coated potassium titanate fibers.

GENERAL DESCRIPTION OF THE INVENTION

The present inventors have now developed a simple procedure which provides a silver coating on the surface of potassium titanate fibers. The inventors have found that when potassium titanate fibers are admixed with a silver ion solution containing an effective amount of a reducing agent, silver is deposited on the surface of potassium titanate fibers rather than on the inner wall of the vessel.

The method of the present invention comprises admixing potassium titanate fibers with a reducing agent present in a silver ion solution so as to coat the fiber surfaces with silver. The reducing agent can be mixed preliminarily with the silver ion solution, or it can be added to a mixture of the silver ion solution and the potassim titanate fibers. If the reducing agent is premixed with the silver ion solution, the selection of the type and amount of the reducing agent is important or the reaction will not proceed before the fibers are charged. The silver ion solution employed in the present invention is, preferably, a silver nitrate solution.

Organic compounds such as formalin or organic acids such as formic acid, or saccharides such as sugar, as well as inorganic compounds such as hydrazine or inorganic acids such as Rochelle salt, or hydrides such as sodium boron hydride can be used as the reducing agent. The amount of the reducing agent may correspond to the amount of the depositing silver. It can exceed the amount of the silver ion.

It is also possible to provide a metal coating other than silver, superimposed on the silver-coated surface of the potassium titanate fibers. For example, an electroless copper coating, using a conventional copper sulfate solution, or nickel coating using a conventional electroless nickel solution, can be applied over the silver coating.

When the surface of the potassium titanate fibers is coated with silver, it is preferable to apply an electroless gold coating thereover so as to prevent oxidation. If the silver-coated surface of the potassium titanate fibers is provided with a superimposed coating, an electroless coating of nickel, tin, zinc, chromium, nickel-cobalt alloy or gold is preferably provided over the copper coat to prevent oxidation.

The potassium titanate fibers usefully employed in the present invention can be defined by the following formula $$nK_2O \cdot mTiO_2 \cdot lH_2O$$

with the ratio between the smaller diameter and the larger diameter of the potassium titanate fibers being 1:10 or greater, and wherein n and l are a positive whole or decimal number greater than zero and m is a positive whole or decimal number. Essentially, the present invention is practicable when the n, m and l have the above meanings. Particularly effective potassium titanate fibers are those wherein $n=2$, $m=11$ and $l=3$ and those wherein $n=0.05$, $m=2$ and $l=1$. These potassium titanate fibers exhibit excellent properties. In practice, however, it is difficult to classify with extreme precision the fiber material according to the values of n, m and l. As for the ratio between the smaller and the larger diameters, the above range is generally effective with potassium titanate fibers having a diameter ranging from 0.1–1 $\mu$m and a length ranging from 10–300 $\mu$m.

One of the advantages of the present invention resides in the fact that the silver ion solution does not contain any alkali ions which promote reduction reaction.

Potassium titanate in forms other than a fiber (such as crystal or powder) can also be coated with silver in accordance with the present invention.

Depending on the values of l, m and n, the potassium titanate fibers can have a lower activity and thus have less silver deposition. In such a case, a small addition of alkali ions (such as ammonium ion) or adequate control of temperature will achieve an excellent silver coating.

According to the method of the present invention, the surface of the potassium titanate fibers can be easily coated with silver. Moreover, the resulting silver-coated surface can be further coated with various metals other than silver. The method of the present invention requires no pretreatment for activating the surface of potassium titanate fibers, such as an activation treatment using a palladium mixture or a surface roughening treatment using a chromic acid mixture which can cause environmental contamination.

Potassium titanate fibers are a higly active substance exhibiting high reactivity and high ion adsorption. When mixed in a solution, the substance releases a small amount of alkali ions into the solution. Without being bound by any theory, it is believed that this release of a small amount of alkali ions renders the surface of the fibers active toward silver, thereby causing the silver to be easily deposited and reduced in situ. The surface of potassium titanate fibers and the silver are chemically bonded in accordance with the present invention. This bonding effect is considered to be different from a mechanical bonding of the anchor effect type found in conventional metal coatings on insulating materials. In other words, when the surface of a resin composite material containing potassium titanate fibers as the filler is silver-coated, a silver coating exhibiting a considerable bonding strength can be obtained even if the surface is flat. The excellent bonding strength has been confirmed by the force required to peel off the silver coating, which force was much greater than experienced in a conventional bonding of the anchor effect type.

According to the present invention, potassium titanate fibers can be metal coated by a simple process. As the coating of the present invention does not rely on an anchor effect, the surface of the potassium titanate fibers does not require any pretreatment, such as roughening the surface and the present process does not involve any treatment using a contaminating chromic acid mixture.

The silver-coated potassium titanate fiber material obtained in accordance with the present invention has an excellent affinity with other metals. It is therefore possible to form a metal composite using the silver-coated potassium titanate fiber material of the present invention as a reinforcement material. The resulting metal composite material is light in weight and superior in dimensional stability, conductivity, wear resistance and heat resistance. The silver-coated potassium titanate fiber material of the present invention can also be used to form a resin composite. In this embodiment of the present invention, the metal coated fibers can be well dispersed, so that the resin composite is conductive. A resin composite according to the present invention can be used as a shielding material. The silver-coated potassium titanate fiber material according to the present invention can also be used as a metal catalyst. It is also possible to combine the metal coated potassium titanate fibers on the surface of a resin composite material and subsequently coat the thus prepared resin composite with metal. Metal coated potassium titanate fibers according to the present invention can therefore be effectively utilized in various industrial applications.

DETAILED DESCRIPTION OF THE INVENTION

The present invention will now be described in more detail by way of the following examples, which examples are given to illustrate the present invention and do not in any way limit the scope of the invention.

EXAMPLE 1

300 g of potassium titanate fibers having an average length of 100 μm and a formula of $2K_2 \cdot 11 TiO_2 \cdot 3H_2O$ were admixed with a solution containing 15 g of silver nitrate dissolved in 1000 ml of water. The resulting mixture was vigorously stirred and 5 ml of formalin as a reducing agent were added. Silver was deposited on the surface of the potassium titanate fibers and the color changed to metallic black. The resulting silver-coated potassium titanate fibers were washed and dried. Chemical analysis of 1 g of the resulting fibers revealed a 3.1 weight percent silver deposition. The fiber was tightly coated with the silver. The resultant silver-coated potassium titanate fibers were combined with copper powder in a weight ratio of 3:7. After thoroughly mixing these components, the mixture was charged in a pressure molding die and then sintered under vacuum at 900° C. for 1 hour. The bending modulus of rupture of the resulting sintered material was measured and found to be 800 kg/cm².

In comparison, a sintered material was obtained using potassium titanate fibers of the same type as noted above without, however, a silver coating thereon. The uncoated potassium titanate fibers and copper powder were sintered under the same conditions as above. The bending modulus of rupture of this comparison material was only 500 kg/cm².

EXAMPLE 2

In accordance with the procedures outlined in Example 1 above, 300 g of potassium titanate fibers as defined in Example 1 were added to a solution containing 3 g of silver nitrate in 1000 ml of water. The mixture was stirred vigorously before adding 5 ml of formalin as a reducing agent. Silver became deposited on the surface of the potassium titanate fibers and the color changed to metallic black. The resulting silver-coated potassium titanate fibers were washed and dried. The potassium titanate fibers were tightly coated with silver. Chemical analysis of 1 g of the resulting fibers revealed a 0.6 weight percent silver deposition.

EXAMPLE 3

300 g of potassium titanate fibers having the formula $(0.05K_2O \cdot 2TiO_2 \cdot H_2O)$ were added to a solution containing 1 g of silver nitrate dissolved in 1000 ml of water. The resultant mixture was vigorously stirred and mixed well with 1 ml of ammonia water before adding 5 ml of formalin as a reducing agent. Silver became deposited on the surface of the potassium titanate fibers and the color changed to metallic black. Chemical analysis of 1 g of the resulting fibers showed a 0.2 weight percent silver deposition. The fiber was tightly coated with silver.

EXAMPLE 4

100 g of potassium titanate fibers having an average length of 10 μm were introduced into 2 liters of a 10% silver nitrate solution, to which 10 ml formalin (30% $CH_3CHO$) were further added so as to obtain silver-coated potassium titanate fibers.

The resultant silver-coated potassium titanate fibers exhibited an extremely high conductivity. When used as a filler for a paste material for a thick-film circuit, the silver-coated fibers exhibited excellent conductivity and circuit stability.

EXAMPLE 5

100 g of potassium titanate fibers having an average length of 150 μm were introduced into 1 liter of a 0.2% silver nitrate solution containing 10 ml (99%) of formic acid as a reducing agent. The resulting silver-coated potassium titanate fibers were then treated with 2 liters of an electroless copper sulfate solution to obtain a copper coating superimposed on the silver-coated potassium titanate fibers.

The contacting force between the dual metal coating and the potassium titanate fibers is very strong and when mixed in metallic copper, the coefficient of thermal expansion of copper can be decreased. By adding the copper-silver coated fiber in an amount of 10 weight percent during the manufacture of a copper sheet, the coefficient of thermal expansion was decreased from a normal $18 \times 10^{-6}$ to about $10 \times 10^{-6}$.

EXAMPLE 6

100 g of potassium titanate fibers having an average length of 60 μm were introduced into 1 liter of a 0.2% silver nitrate solution containing 20 grams of granulated sugar as a reducing agent. The resulting silver-coated potassium titanate fibers were then contacted with 2 liters of an electroless copper sulfate solution and subsequently with 1 liter of an electroless nickel solution, so as to prevent oxidation of copper.

The resultant potassium titanate fiber provided with this copper coating procedure is extremely high in conductivity and is suitable as a filler for shield material made of engineering plastics. 10 weight percent of the copper coated fiber was added to an engineering plastic to obtain a sheet material 2.5 mm in thickness. The sheet material was formed into a hexahedron box 50 cm on a side. A coil which is electromagnetically driven via a coaxial cable was mounted inside the hexahedron box which was grounded. The shielding effect was tested with and without the box. The shielding effect was measured to be greater than 30 dB at 1 MHz.

EXAMPLE 7

100 g of potassium titanate fibers having an average length of 80 μm were introduced into 1 liter of a 0.1% silver nitrate solution, containing 5 ml of formalin (30% $CH_3CHO$) as a reducing agent. The resulting silver-coated potassium titanate fibers were then treated with 2 liters of an electroless nickel solution so as to obtain a nickel coating on the silver-coated potassium titanate fibers.

The resulting dual metal coated potassium titanate fibers are suitable for improving the strength of and the destaticizing properties of nylon resin. 20 weight percent of the above defined metal coated fibers was kneaded with nylon resin (Nylon 66) and molded into a camera drive gear by an injection molding machine. The gear thus obtained exhibited a resistivity of $10^6$ ohms, generated less static electricity and exhibited good dimensional stability and excellent wear resistance.

EXAMPLE 8

100 g of potassium titanate fibers having an average length of 5 μm were introduced into 2 liters of a 25% silver nitrate solution containing 5 ml hydrazine (phenylhydrazin 100%) as a reducing agent. The resultant silver-coated potassium titanate fibers had a very high conductivity. 75 weight percent of said silver coated potassium titanate fibers was added as a filler to a conductive paste material of epoxy resin base. The conductive paste material thus obtained exhibited good conductivity, having a specific resistance of $10^{-3}$ ohm cm. A circuit printed with this conductive paste material showed no cracking when dried at a high temperature and a stable circuit was obtained.

EXAMPLE 9

Potassium titanate fibers having an average length of 250 μm and glass fibers having an average length of 10 mm and a diameter of 9 μm were mixed at a ratio of 1:1 to obtain a glass paper containing potassium titanate fibers in an amount of 80 g/m². The paper was placed in a 0.2% silver nitrate solution containing 20 grams of Rochelle salt. The paper was then treated in an electroless copper sulfate solution, followed by a treatment in an electroless nickel solution. The silver-coated potassium titanate fibers in the paper were thus provided, serially with superimposed copper and nickel coatings, the nickel coating preventing oxidation of the copper coating. The resulting paper is conductive and can be used as a material for shielding high frequency waves. The trimetal coated paper was impregnated with an adhesive and taken up via a release paper to obtain a double adhesive shield tape. The shield paper thus obtained was placed over the surface of a hexahedron carboard box about 50 cm on a side. A coil electromagnetically driven via a coaxial cable was mounted inside the box, and the box was grounded. The shielding effect was tested with and without the box. The effect was greater than 30 dB at 1 MHz.

EXAMPLE 10

Potassium titanate fibers having an average length of 110 μm were pulverized to obtain a powder having an average particle diameter of 1 μm. 100 g of this powder were introduced into 1 liter of a 0.3% silver nitrate solution containing 20 grams of sodium boron hydride as a reducing agent and then in 1 liter of an electroless copper solution so as to provide a copper coating on the silver-coated potassium titanate fibers.

The dual metal coated fibers exhibited a very high conductivity and are suitable as coating material for shielding.

The resulting copper-coated, silver-coated potassium titanate fibers were added in an amount of 20 weight percent to a shield material of an acrylic resin base. Dispersion of the fibers was very satisfactory. The resulting shield material was applied in a thickness of 20 μm on the surface of a hexahedron cardboard box about 50 cm on a side. A coil electromagnetically driven via a coaxial cable was mounted inside the box and the box was grounded. The shielding effect was tested with and without the box. As a result, the effect was greater than 30 dB at 1 MHz.

What is claimed is:

1. Fibrous potassium titanate having the formula $nK_2O \cdot mTiO_2 \cdot 1H_2O$ wherein n and 1 are positive whole or decimal numbers greater than zero and m is a positive whole or decimal number, the surface of said fibrous potassium titanate being coast with silver and the silver-coated surface being superimposed with a coating of a metal other than silver.

2. The fibrous potassium titanate of claim 1 wherein n=2, m=11 and 1=3.

3. The fibrous potassium titanate of claim 1 wherein n=0.05, m=2 and 1=1.

4. The fibrous potassium titanate of claim 1 wherein said coasting of a metal other than silver superimposed on the silver-coated surface is copper or nickel.

5. The fibrous potassium titanate of claim 1 wherein said coating of a metal other than silver superimposed on the silver-coated surface is copper and said copper is superimposed with a coating of nickle.

* * * * *